A. J. KOHANSKI.
AUTOMOBILE WHEEL RIM.
APPLICATION FILED OCT. 23, 1920.
1,390,141.
Patented Sept. 6, 1921.
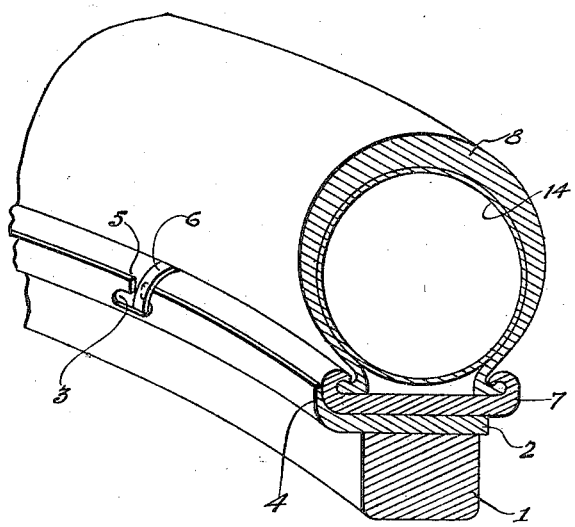
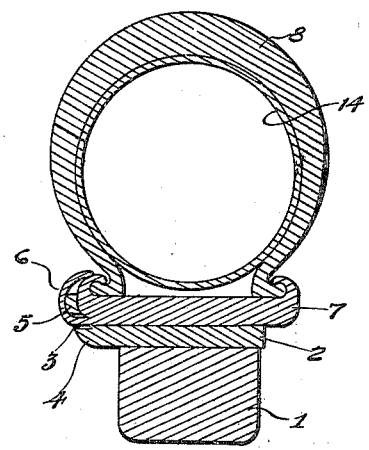
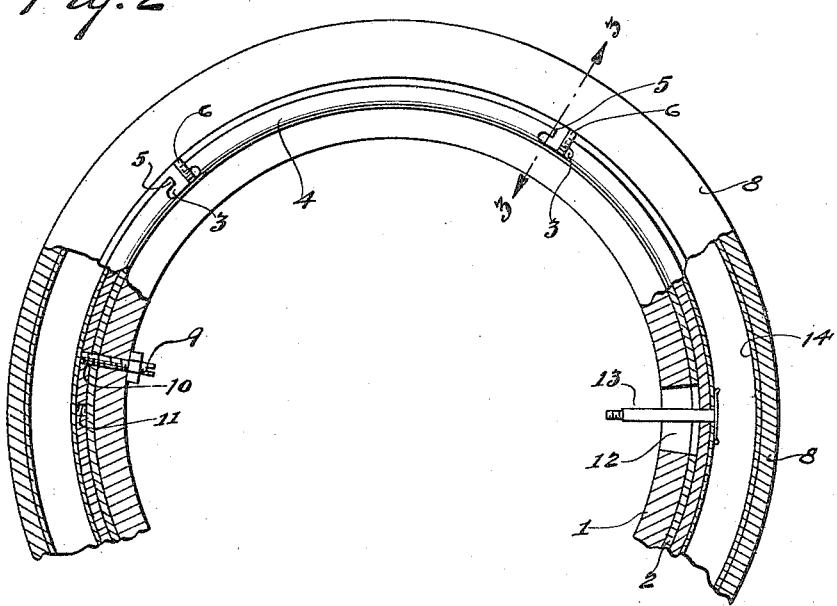
AUGUST J. KOHANSKI
INVENTOR
BY *Victor J. Evans*
ATTORNEY

UNITED STATES PATENT OFFICE.

AUGUST J. KOHANSKI, OF CHICAGO, ILLINOIS.

AUTOMOBILE-WHEEL RIM.

1,390,141.  Specification of Letters Patent.  Patented Sept. 6, 1921.

Application filed October 23, 1920. Serial No. 419,014.

*To all whom it may concern:*

Be it known that I, AUGUST J. KOHANSKI, a citizen of the United States, residing at Chicago, in the county of Cook and State of Illinois, have invented new and useful Improvements in Automobile-Wheel Rims, of which the following is a specification.

This invention relates to vehicle wheel rims and an object of the invention is to provide a simple, efficient and durable wheel rim structure constructed to permit the ready and easy removal from, or mounting upon a wheel structure of a demountable tire carrying rim.

More specifically, the invention comprehends the provision of a demountable rim provided with a plurality of circumferentially spaced straps on one side thereof, which are adapted to engage over projections formed upon the wheel rim to detachably connect the demountable rim and wheel rim and the invention also comprises means for locking the rims against relative movement.

Other objects of the invention will appear in the following detailed description taken in connection with the accompanying drawing wherein:

Figure 1 is a perspective view of a fragment of a wheel and the improved wheel rim.

Fig. 2 is a fragmentary view of the wheel, partly in section and partly in side elevation.

Fig. 3 is a section on line 3—3 of Fig. 2.

Referring more particularly to the drawings, the felly 1 of the vehicle wheel has a rim 2 mounted thereon, which is provided with substantially T-shaped slots 3, having their faces opening out to the outer edge of the out turned flange 4 on the rim, providing spaced pairs of oppositely facing lugs 5. The lugs 5 in each pair have their facing sides spaced to permit the positioning therebetween of the straps 6 which are carried by or formed upon the demountable tire carrying rim 7. The tire carrying rim 7 may have a pneumatic or cushion tire 8, preferably a pneumatic tire of any conventional type, carried thereby in the usual manner. In mounting a demountable tire rim 7 and tire, carried thereby, upon the wheel felly 1 and rim 2, the demountable rim 7 is positioned so that the straps 6 will aline with the stem portion of the T openings 3, after which the demountable rim 7 is moved laterally upon the wheel rim 2 until the flange 4 is engaged by one flange of the demountable rim 7 after which the demountable rim is rotated slightly, to cause one of the lugs 5 of each pair of lugs to engage within the adjacent strap 6, as shown in Fig. 3 of the drawing, thus preventing lateral movement of the demountable rim 7 relative to the wheel rim 2. The engagement of the straps 6 in the ends of the T slots 3 prevent further rotary movement of the demountable rim 7 relative to the wheel rim, however, the demountable rim 7 can be moved or rotated upon the wheel rim 2 in the direction opposed to the direction of its initial rotation, and to prevent such accidental rotation, a set screw 9 is provided which is threaded into either of the threaded recesses 10 or 11 in the demountable rim 7 to lock the rims against relative movement.

It is, of course, understood, that the demountable rim 2 may be rotated in either direction, upon its initial direction, and therefore, the two threaded recesses 10 and 11 are provided, being spaced proper distances to permit the fitting of the set screw 9 therein when the demountable rim has reached the limit of its rotation in either direction relative to the wheel rim 2. The wheel rim 2 and felly 1 are provided with elongated openings 12 through which the stem of the inflating valve 13 of the inner tube 14 of the tire extends, to permit movement of the inflating valve stem with movement of the demountable rim and tire.

It is, of course, to be understood that the invention may be constructed in various other manners and the parts associated in different relations and, therefore, I do not desire to be limited in any manner except as set forth in the claims hereunto appended.

Having thus described my invention what I claim is:

1. In a wheel rim structure, the combination of a wheel rim, a demountable tire carrying rim adapted to be moved laterally upon the wheel rim, lugs on the wheel rim, and straps carried by said demountable tire carrying rim for engagement with said lugs to lock the rims against relative lateral movement.

2. In a wheel rim structure, a wheel rim provided with an outwardly extending circumferential flange, said flange provided with circumferentially spaced T slots opening out through its outer edge and forming lugs on the rim, a demountable tire carrying rim, and straps carried by said demountable tire carrying rim for engagement with said lugs to lock said rims against relative lateral movement.

3. In a wheel rim structure, a wheel rim provided with an outwardly extending circumferential flange, said flange provided with circumferentially spaced T slots opening out through its outer edge, and forming lugs on the rim, a demountable tire carrying rim and straps carried by said demountable tire carrying rim for engagement with said lugs to lock said rims against relative lateral movement, said demountable rim provided with threaded recesses and a set screw adapted to engage in one of said recesses for locking said rims against relative movement.

4. In a wheel rim structure, the combination of a wheel rim, a demountable tire carrying rim adapted to be moved laterally upon the wheel rim, lugs on the wheel rim, straps carried by said demountable tire carrying rim for engagement with said lugs to lock the rims against relative lateral movement, and means for locking the rims against relative rotary movement.

5. In a wheel rim structure, the combination of a wheel rim, a demountable tire carrying rim adapted to be moved laterally upon the wheel rim, lugs on the wheel rim, straps carried by said demountable tire carrying rim for engagement with said lugs to lock the rims against relative lateral movement, said demountable rim provided with threaded recesses, and a set screw adapted to engage in one of said recesses for locking said rims against relative movement.

In testimony whereof I affix my signature.

AUGUST J. KOHANSKI.